United States Patent [19]

Salomon et al.

[11] 4,414,762
[45] Nov. 15, 1983

[54] SLIPPER FOR A SKI BOOT, AND PROCESS FOR ITS MANUFACTURE

[75] Inventors: Georges P. J. Salomon, Annecy; Alain Leveque, La Balme de Sillingy, both of France

[73] Assignee: Etablissements Francois Salomon & Fils, Annecy, France

[21] Appl. No.: 313,918

[22] Filed: Oct. 22, 1981

[30] Foreign Application Priority Data

Oct. 31, 1980 [FR] France ................ 80 23549

[51] Int. Cl.³ .......................... A43B 5/04; A43B 7/14; A43D 9/00
[52] U.S. Cl. ........................... 36/117; 36/93; 12/142 P
[58] Field of Search .............. 36/93, 117; 12/142 P

[56] References Cited

U.S. PATENT DOCUMENTS 3,786,580 1/1974 Dalebout .............................. 36/117
3,896,202 7/1975 Palau .................................. 36/117

Primary Examiner—Patrick D. Lawson
Attorney, Agent, or Firm—Pollock, Vande Sande & Priddy

[57] ABSTRACT

A slipper for a ski boot produced by injection of a foam mixture of plastic material between the walls of two socks placed upon a form set in a mold, the outer of the two socks comprising a very thin, extensible sheet having the same dimensions as the inner sock when the two are in unstressed condition.

8 Claims, 8 Drawing Figures

SLIPPER FOR A SKI BOOT, AND PROCESS FOR ITS MANUFACTURE

SUMMARY OF THE INVENTION

The invention relates to a slipper for a ski boot intended to fill the space between the skier's foot and the rigid outer shell of the boot, and to the process for its manufacture.

BACKGROUND OF THE INVENTION

Inspection of ski boots presently in the market shows that they comprise, in most cases, two distinct elements which are separately manufactured, namely, an inner slipper and an outer boot constituted by a shell and one or several portions of molded plastic material.

Various types of slippers for ski boots are known, among them (a) assembled slippers made either by sewing together of elements or by cutting up sheet or plate material, or by the injection of synthetic cellular resin between two walls of leather or other plastic material; and (b) slippers manufactured from plates of closed cell foam, attached together by sewing or soldering after having been heat-formed to the desired dimensions.

Also known is a slipper obtained by pressure molding of a cellular foam directly between the walls of a mold, as well as a manufacturing process which consists of injecting polyurethane foam between two walls placed in a mold and defining the general form of a slipper whose integral tongue is subsequently cut to form. Projections arranged on the mold limit at specific locations the regions into which the polyurethane foam is not to penetrate, and determine the locations of the least thickness suited, for example, for the cutting of a tongue.

However, all of these types of slipper have disadvantages which result in high costs of production, because of either the price of the materials used or of the labor required.

Thus, in the last-mentioned process, the walls which are to form the slipper consist of two socks, one inserted in the other, the outer sock having greater dimensions than the inner sock, so that a space is left between them. This arrangement is dictated by the fact that the materials used for this type of sock (PVC—coated fabric) are not very elastic. It is thus necessary to provide a free space between the socks so that the polyurethane mixture in liquid phase can flow between the walls and then expand to the point where it fills the entire interior space of the mold during the expansion thrust phase, without causing the seams and/or solder of the minimally elastic walls of the socks to burst.

PURPOSE OF THE INVENTION

The present invention overcomes the above-recited disadvantages. For this purpose, it comprises a novel application of a product and technique already known in the production of slippers. The product known per se is a polyurethane film whose thickness may be in the range of 25 to 75 microns and which is available commercially "as is" or on a polyurethane support which must be stripped off before use of the film. Upon contact with PVC-coated fabric, this polyurethane film is capable of extraordinary elastic elongation, of the order of 300 to 400%, thus permitting its use under high performance requirements.

The process according to the invention thus consists, for a given size, of producing, in a manner known per se, a first sock made up, for example, from a complex of fabric supported by a layer of closed cell foam, and a second sock of polyurethane film whose two walls are hot-soldered and whose dimensions are at most equal to those of the first sock. This second sock is then emplaced over the first sock in such a manner that it fits and adjusts itself perfectly to the latter. The second sock, which constitutes the outer wall of the future slipper, has been provided in advance with a flow conduit which attaches itself on the polyurethane film upon the emplacement of an aperture arranged for this purpose in the second sock, at a location selected for its suitability for the injection of the polyurethane mixture.

The assembly comprising the two socks is then placed upon a form in such a manner that they fit the form exactly. Because of the remarkable stretchability of the polyurethane film of which the outer sock is composed, the latter, already adjusted on the inner sock which is itself stretched upon the form, is even more closely adjusted thereto, without leaving any play or space between the two socks. The result is a certain surface tension the pressure of which is brought to bear on the entire outer surface of the inner sock.

This process improves the conditions for molding the slipper because the risks, present in prior art processes, of pinching the outer sock during closure of the mold or of having an outer sock with larger dimensions than the inner sock, are obviated.

Another advantageous feature of the process according to the present invention is the fact that, the outer sock being tightly fitted to the inner sock which sheathes the form permits better filling with the polyurethane mixture in liquid phase, due to the creation of localized pressure at the site of the flow conduit, which pressure is immediately distributed between the two walls of the inner and outer socks flattened one against the other. The polyurethane mixture in liquid phase spreads all the more quickly and uniformly between the two contacting surfaces of the socks as the contact assures, in addition to the effect of the pressure, spreading due to capillary action of the liquid phase mixture. A film of the liquid mixture is thus formed within 6 to 12 seconds, which film covers the entire interior of the walls of the socks, allowing the polymerization phase of the polyurethane mixture also to occur in a regular, uniform manner, thereby filling up the remaining empty space between the stretched outer sock and the walls of the mold.

BRIEF INTRODUCTION TO THE DRAWINGS

In order that the invention may be more clearly understood, reference will now be made to the accompanying drawings, wherein an embodiment of the invention is shown for purposes of illustration, and wherein.

Figure 4:
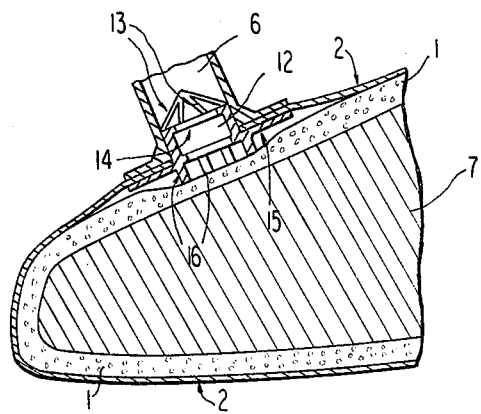
FIG. 4 is a detail view, partly in section, of the front of the form fitted with the two socks, the outer sock being provided with a flow conduit.
Figure 7:
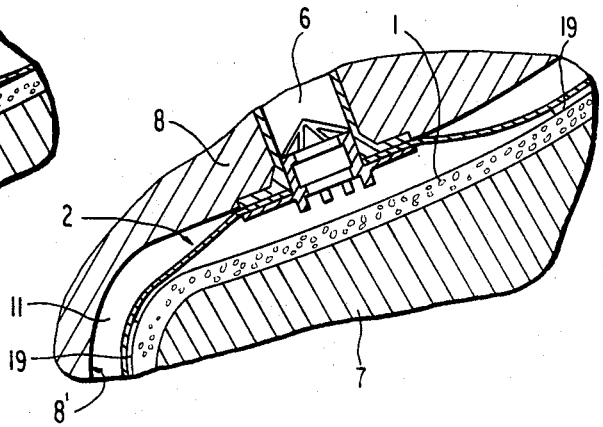
Figure 8:
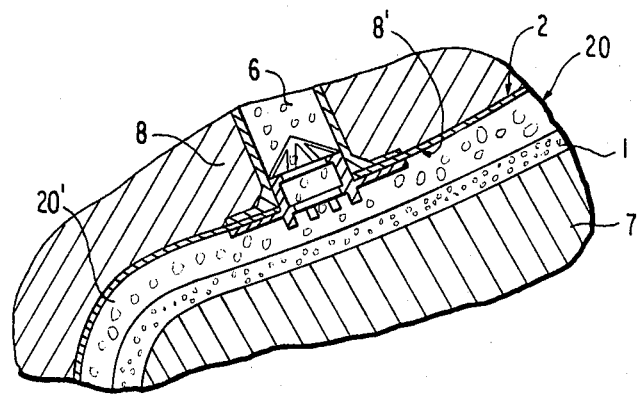

FIGS. 5 to 8 show, in enlarged views, the front of the form fitted in accordance with FIG. 4, respectively during the placement of the form in the mold (FIG. 5), during the beginning of flow of the polyurethance mixture (FIG. 6), during the short liquid phase of the mixture between the walls of the socks (FIG. 7) and, finally, during the expansion and polymerization of the polyurethane mixture producing the slipper wall of thickened foam (FIG. 8).

DESCRIPTION OF PREFERRED EMBODIMENT

Figure 1:
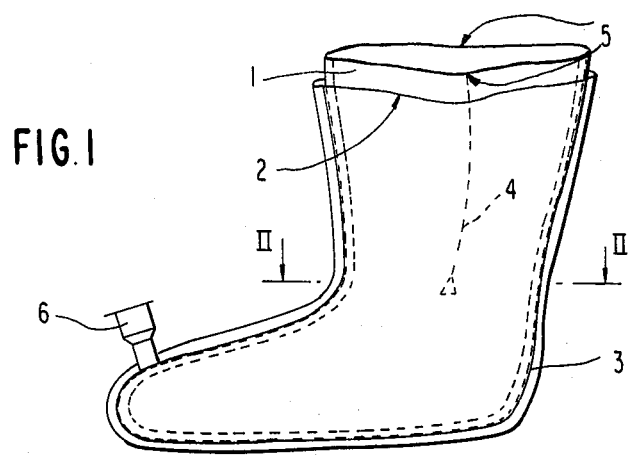
FIG. 1 is a side view showing two socks fitted one over the other before they are placed on a form.
Figure 2:
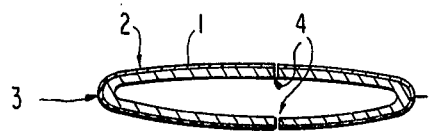
FIG. 2 is a section along lines II—II of FIG. 1, showing adjustment of the outer sock upon the inner sock.

In FIG. 1, one of the stages of the process of producing a slipper according to the invention is shown by the fitting of two socks 1 and 2 one upon the other. The first, inner sock 1, of Jersey fabric, on a backing of polyethylene foam, for example, and the second, outer sock 2 of polyurethane film having a thickness of 25 to 75 microns, are tightly assembled, since the dimension of outer sock 2 are at most equal to those of inner sock 1. This will be clear from FIG. 2, where the very great elasticity of sock 2 of polyurethane film, whose walls are assembled, e.g., by solder 3, eliminates all free space between the two socks. Moreover, inner sock 1 has been provided with lateral slots 4 for hooking on the form, these slots termirating with a seam 5. Finally, an aperture is located at the front of outer sock 2 in which a flow conduit 6 is attached.

Figure 3:
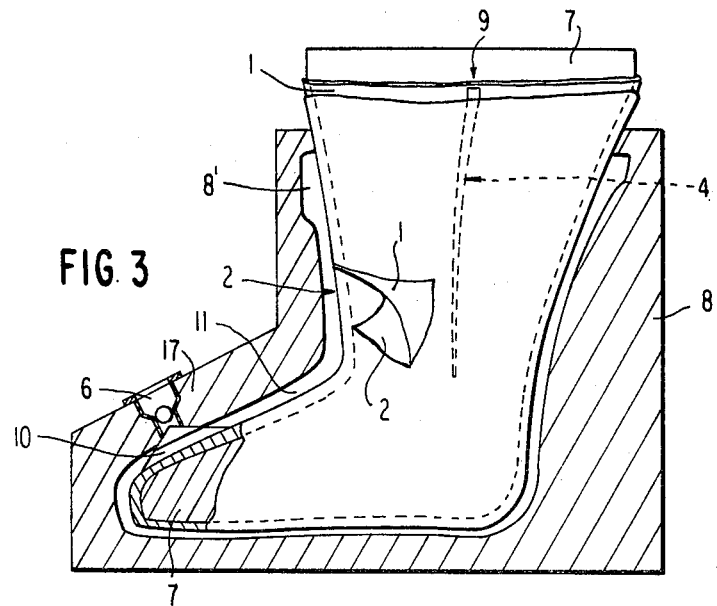
FIG. 3 is a side view in section, showing the placement of the sock assembly on the form placed in the mold.

FIG. 3 shows the placement of the assembly of socks 1 and 2 on a foot form 7, the entire assembly then being placed in a mold 8, shown in section. This placement is effected by simultaneously drawing the socks onto form 7, inner sock 1 being stretched on form 7 due to stops 5 of lateral slots 4 hooking on catches 9 provided on the form. Outer sock 2 is stretched and fitted to sock 1 because of the combination of the properties of adherence and very great elasticity of the polyurethane film. Form 7 is thus dressed in such a way that outer sock 2 forms an outer retaining sheath upon inner sock 1. This is shown in FIG. 3 by a slash in sock 2 in the leg area of the future slipper.

Apart from the foregoing, conduit 6, placed at the front of form 7, i.e., corresponding to the forefoot, determines a completely localized space for the reception of the liquid mixture 10. The fact that the socks which are to define the internal and external walls of the future slipper, are already side-by-side in the state of rest, further increases the force of adherence of one to the other when they are mounted and stretched on form 7. At this stage of placement of the dressed form in the mold, it appears that a space 11 remains unfilled between the inner walls 8' of the mold and the outer surface 2' of the wall of sock 2, whereby the mold can be closed without the risk of pinching the socks which is present in prior art processes.

As may be seen in FIG. 4, conduit 6 is attached to the front of outer sock 1 by pinching of a small nozzle 12 adjustable in conduit 6. This nozzle is preferably provided at its upper portion with six fins 13 forming a cone and having their seat on a rim 14, which acts as a baffle during the flow of the liquid mixture. The association of fins 13 and baffle 14 thus considerably moderates the turbulence occurring during the introduction of the mixture in conduit 6.

Base 15 of nozzle 12 is provided in its lower portion with standards 16 which assure the passage of the polyurethane mixture in liquid phase, even in the event that nozzle 12 is forced away from conduit 6 through overpressure of the mixture at the moment of injection.

For safety reasons, a non-return valve is provided in the body of conduit 6, this valve preferably being embodied by a steel ball 17, as schematically shown in FIG. 3.

Figure 5:
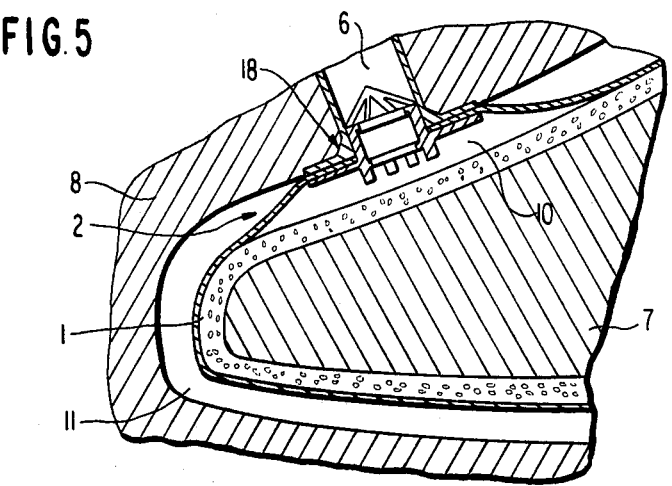
Figure 6:
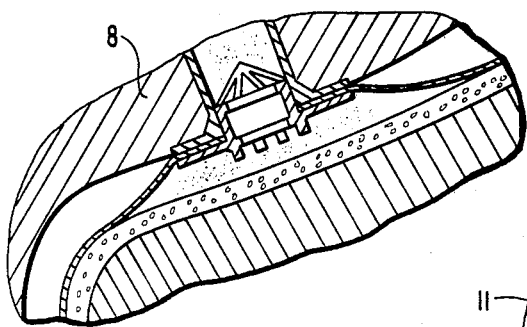

FIG. 5 is an enlarged section view of a portion of FIG. 3, showing more clearly the space 10 created between the two socks 1 and 2 by the placement of form 7 clothed by the socks and their injection conduit 6, which center themselves in a cavity provided in the mold for that purpose. When the mold recloses, the polyurethane film of the outer sock, being pinched at the inner portion of the conduit-nozzle assembly, is separated from the inner sock so as to define a space 10 necessary for the efficacious introduction of the polyurethane liquid, shown in grey in FIG. 6. In effect, the very great elasticity of the polyurethane film allows it to follow the conduit during its centering in the mold. Then, during introduction of the mixture in liquid phase, which penetrates through the conduit at great speed, localized pressure is created in space 10. However, since the polyurethane film is very elastic, the liquid spreads rapidly as a result of this pressure, all the more so because capillary action occurs between the two walls of socks 1 and 2. Thus, due to the joint effect of the localized pressure during injection and the spreading through capillary action of the liquid mixture, an orderly distribution of the polyurethane mixture is achieved, in the form of a liquid film which covers the entire inner surface located between the two socks, as shown in FIG. 7.

Once the introduction and the spreading of the liquid mixture is completed, the polymerization phase begins and continues so as to form the thick foam wall 20' of slipper 20 (FIG. 8). This forces outer sock 2 against mold wall 8' and fills the space 11 existing between the mold and form, the expansion pressure of the foam being sufficient to overcome the tension of the polyurethane film on inner sock 1.

When the foam of the slipper wall has stabilized, one begins to withdraw from the mold the slipper whose outer skin is composed of the polyurethane film, whose excellent properties of elasticity and of resistance to abrasion and tearing have thus been put to good use.

In all cases, the resulting slipper not only possesses the desired level of comfort, but also, with respect to prior art slippers, the following additional advantages: (a) improved resistance to abrasion; (b) a more finished lock, on both the inside and the outside; and (c) a lower cost of production due to use of the polyurethane film as the outer sock, because the use and adaptation of this material reduces scrap and improves molding and unmolding conditions at only slightly higher materials cost.

What we claim is:

1. Process for the manufacture of a slipper for a ski boot comprising the injection of a plastic foam mixture between the walls of two socks, comprising an inner sock and an outer sock, placed on a form which is put in a mold, including the steps of
(a) producing said outer sock constituting the outer skin of said slipper from a thin, expansible sheet; and
(b) adjusting said outer sock to said inner sock constituting the inner wall of said slipper;
(c) said outer sock having dimensions no larger than those of said inner sock when both of said socks are in a state of rest.

2. Process according to claim 1, wherein said outer sock is initially slipped over said inner sock, whereafter the assembly of both socks is placed on a form for molding.

3. Process according to claim 1 or 2, wherein said thin, expansible sheet comprises a polyurethane film having a thickness of between 25 and 75 microns.

4. Process according to claim 1, wherein a cavity for the reception of said plastic foam mixture is created by the elastic deformation of said outer sock by injecting said mixture through an injection conduit into a localized area between said inner and outer socks.

5. Process according to claim 4, wherein said injected mixture spreads through capillary action to form a liquid film which covers the facing surfaces of said inner and outer socks, the latter being fitted one against the other without any play therebetween.

6. A slipper for a ski boot, comprising an inner sock and an outer sock having dimensions no greater than those of said inner sock, having plastic material molded therebetween, said plastic material forming a wall of said slipper comprising polyurethane foam exteriorly coated by a thin film of polyurethane, and interiorly coated by woven material.

7. A slipper according to claim 6, wherein said woven material is supported on a layer of polyethylene foam.

8. A slipper for a ski boot comprising an outer sock having an inner wall and constituting the outer skin of said slipper and produced from a thin, expansible sheet, an inner sock having an outer wall and constituting the inner wall of said slipper, said outer sock having dimensions no larger than those of said inner sock when both socks are in a state of rest, and plastic material injected between said inner and outer walls and comprising polyurethane foam exteriorly coated by a thin film of polyurethane and interiorly coated by woven material.

* * * * *